(12) United States Patent
Wittenberg et al.

(10) Patent No.: US 10,849,392 B1
(45) Date of Patent: Dec. 1, 2020

(54) BATTERY WATCH BAND

(71) Applicant: Apple Inc., Cupertino, CA (US)

(72) Inventors: Michael B. Wittenberg, San Francisco, CA (US); Scott W. Slabaugh, Gilroy, CA (US); Stephen E. Dey, San Francisco, CA (US); Benjamin J. Kallman, Cupertino, CA (US); Erik G. De Jong, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 51 days.

(21) Appl. No.: 15/707,998

(22) Filed: Sep. 18, 2017

Related U.S. Application Data (60) Provisional application No. 62/397,268, filed on Sep. 20, 2016.

(51) Int. Cl.
| | |
|---|---|
| A44C 5/14 | (2006.01) |
| H01M 2/10 | (2006.01) |
| G04C 10/00 | (2006.01) |
| H01M 6/46 | (2006.01) |

(52) U.S. Cl.
CPC ............ *A44C 5/14* (2013.01); *G04C 10/00* (2013.01); *H01M 2/1044* (2013.01); *H01M 6/46* (2013.01)

(58) Field of Classification Search
CPC ......... G06F 1/163; H01M 2/1044; A44C 5/00
See application file for complete search history.

(56) References Cited

U.S. PATENT DOCUMENTS

| | | | | | |
|---|---|---|---|---|---|
| 5,258,746 | A | * | 11/1993 | Leitten | G08B 21/0297 340/384.6 |
| 5,633,097 | A | * | 5/1997 | Miller | H01M 6/40 29/623.3 |
| 5,889,737 | A | | 3/1999 | Alameh et al. | |
| 6,528,203 | B1 | * | 3/2003 | Mitamura | H01M 2/1022 429/100 |
| 9,612,617 | B1 | * | 4/2017 | Jaulerry | G06F 1/163 |
| 2004/0224223 | A1 | * | 11/2004 | Sun | H01M 2/1061 429/127 |
| 2005/0189906 | A1 | * | 9/2005 | Sun | A44C 5/0007 320/107 |
| 2011/0089903 | A1 | * | 4/2011 | Heikkinen | H01M 2/1022 320/126 |
| 2014/0002012 | A1 | * | 1/2014 | McCauley | H02J 7/025 320/108 |
| 2014/0078694 | A1 | * | 3/2014 | Wissmar | G04G 17/04 361/749 |
| 2015/0333302 | A1 | * | 11/2015 | Johns | H01M 2/1066 429/127 |
| 2016/0014245 | A1 | * | 1/2016 | Zaitsev | G06F 1/163 455/557 |

(Continued)

*Primary Examiner* — Daniel P Wicklund
(74) *Attorney, Agent, or Firm* — Morgan, Lewis & Bockius LLP (57) ABSTRACT

A watch can include a watch body and a watch band that is capable of housing batteries and transferring power from the batteries to the watch body to power the watch. The watch band can include an inner frame that has multiple slots, each slot configured to house a corresponding battery. The watch band can further include an outer covering that encompasses the inner structure and hermetically seals the batteries. A battery connector operatively connects each of the batteries to each other and to the watch body.

20 Claims, 8 Drawing Sheets

(56) References Cited

U.S. PATENT DOCUMENTS

| | | | |
|---|---|---|---|
| 2016/0070296 A1* | 3/2016 | Koo | G06F 1/163 |
| | | | 361/679.03 |
| 2016/0094259 A1* | 3/2016 | Hatanaka | H04B 1/385 |
| | | | 455/90.2 |
| 2016/0363957 A1* | 12/2016 | Stroetmann | G06F 1/163 |
| 2017/0263376 A1* | 9/2017 | Verschueren | H01F 38/14 |
| 2018/0132738 A1* | 5/2018 | Choi | H01M 2/1066 |
| 2018/0210491 A1* | 7/2018 | Song | G06F 1/163 |

\* cited by examiner

*FIG. 15*

BATTERY WATCH BAND

CROSS-REFERENCE TO RELATED APPLICATIONS

This application claims the benefit of U.S. Provisional Application No. 62/397,268, entitled "BATTERY WATCH BAND," filed Sep. 20, 2016, the entirety of which is incorporated herein by reference.

TECHNICAL FIELD

The present description relates in general to a wearable device, and, more particularly, to a watch band for a wristwatch or other wrist-mounted device (e.g., a smartwatch).

BACKGROUND

Some electronic devices may be removably attached to a user. For example, a wristwatch or fitness/health tracking device can be attached to a user's wrist by joining free ends of a watchband together. In one example, wristwatches typically include a case and a band. The case carries the components or mechanisms of the wristwatch including the face. The band extends away from the case so that it can wrap around the wrist of a user. The band may be integral with the case. However, in most cases, the band is a separate part that is attached to the case.

Recent advances in smartwatches have enabled users to do increasingly more on their smartwatches. A longer battery life for a user's smartwatch may enable them to use their smartwatch with less frequent recharging.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

A smartwatch offers a variety of different features and applications that make the smartwatch attractive to users. Smartwatches can be powered by a rechargeable battery that is located within a watch body. However, different features and applications offered by smartwatches can require differing amounts of processing and power, which can drain the battery life of the rechargeable battery and diminish the user's ability to use the smartwatch or some features of the smartwatch as they desire without recharging the battery. The amount of power that can be produced by a battery can be based on the volume of the battery itself. Accordingly, the amount of power producible by batteries that are housed within the watch body is limited by the space available in the watch body.

Some embodiments described herein include a watch band for a smartwatch that secures the smartwatch to a user's wrist and also houses batteries in the watch band in order to provide additional battery life to the smartwatch. This can provide an additional power source for the smartwatch without increasing the size of a watch body. Also, since smartwatches already include watch bands, such embodiments provide additional power without adding an additional component to the watch band (such as, for example, a supplemental battery pack). To keep the batteries out-of-contact with the external environment, the watch band can hermetically seal the batteries within the watch band. In addition, the watch band can include an inner frame or an outer frame that helps prevent or limit stretching and/or twisting of the watch band in order to help maintain the structural and electrical integrity of the electrical components and the batteries within the watch band.

The present disclosure describes a watch body and watch band architectures for housing batteries within the watch band and for transferring power from the batteries within the watch band to the watch body in order to power the watch. The batteries in the watch band can thus provide additional battery life to the smartwatch without increasing the size of a watch body of the watch.

In some embodiments, a strong inner frame, like an endoskeleton, provides structural support for housing batteries within a watch band, while a flexible outer covering seals the batteries in the watch band. For example, a watch band can house batteries in an inner frame that includes a slot for each battery. A battery connector can connect each of the batteries in the watch band to each other, and the battery connector can be configured to transfer power from the batteries to a watch body connected to the watch band. The inner frame can be constructed of a flexible non-extendable high-strength material. The inner frame helps limit stretching and twisting of the battery connector. An outer covering can entirely encompass the inner frame and hermetically seal the batteries and the battery connector.

In some embodiments, a flexible inner covering seals the batteries within a watch band, while a strong outer covering, like an exoskeleton, provides structural support for the band around the batteries. For example, a watch band can house batteries within slots of an inner covering. A battery connector can connect each of the batteries in the inner covering to each other, and the battery connector can be configured to transfer power from the batteries to a watch connected to the watch band. The inner covering hermetically seals the batteries and the battery connector. An outer frame can have corresponding cavities that correspond to the slots of the inner covering. The outer frame can entirely encompass the inner covering and provide structural support for the watch band to help limit stretching and twisting of the inner covering and the battery connector.

These and other embodiments are discussed below with reference to the figures. However, those skilled in the art will readily appreciate that the detailed description given herein with respect to these figures is for explanatory purposes only and should not be construed as limiting.

Figure 1:
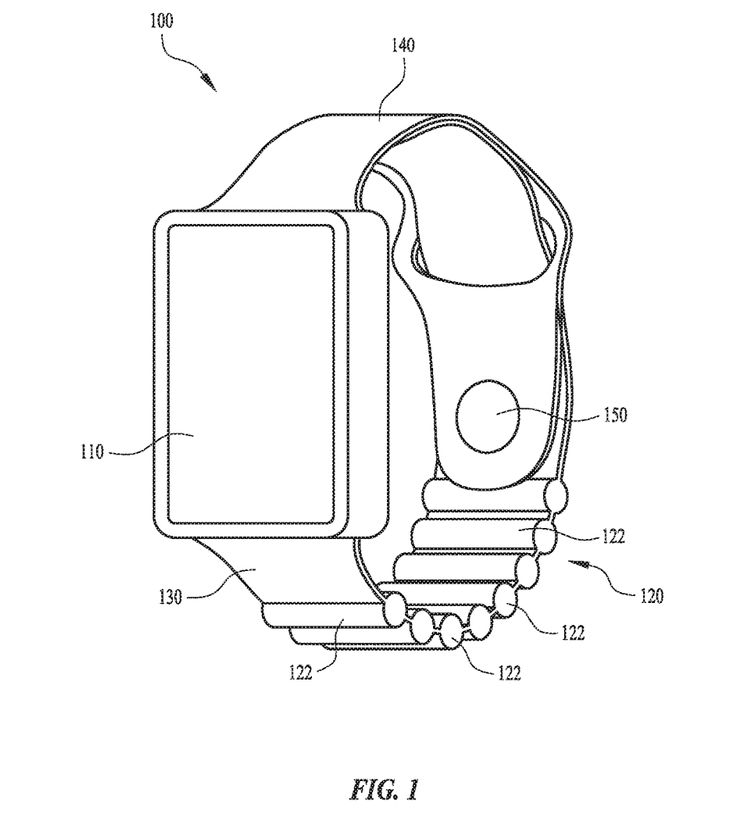
FIG. 1 shows a perspective view of a wearable device including a watch band.

FIG. 1 illustrates a wearable device 100 (e.g., a smartwatch), which can include a watch body 110 and a watch band 120. Watch band 120 can include a first band portion 130 and, optionally, a second band portion 140 having an attachment mechanism 150. Wearable device 100 can be attached and secured to a user's wrist by connecting first band portion 130 to second band portion 140 by attachment mechanism 150. Alternatively or additionally, first band portion 130 can connect directly to watch body 110 at multiple locations to secure the watch without the use of second band portion 140. For example, first band portion 130 can slideably extend through a loop structure attached to watch body 110 and connect to itself.

One or both of first band portion 130 and second band portion 140 can include segments 122 which can each include a battery embedded therein to provide power for wearable device 100. As such, aspects of the first band portion 130 and second band portion 140 described herein can apply to the entirety of watch band 120 or any portion thereof. All or some segments 122 of a watch band 120 can contain a battery or other electronic component, but in other embodiments only some number of segments 122 less than all of segments 122 contain a battery or other electronic component, while other segments are included for aesthetic purposes to provide a consistent look and feel to watch band 120.

Figure 2:
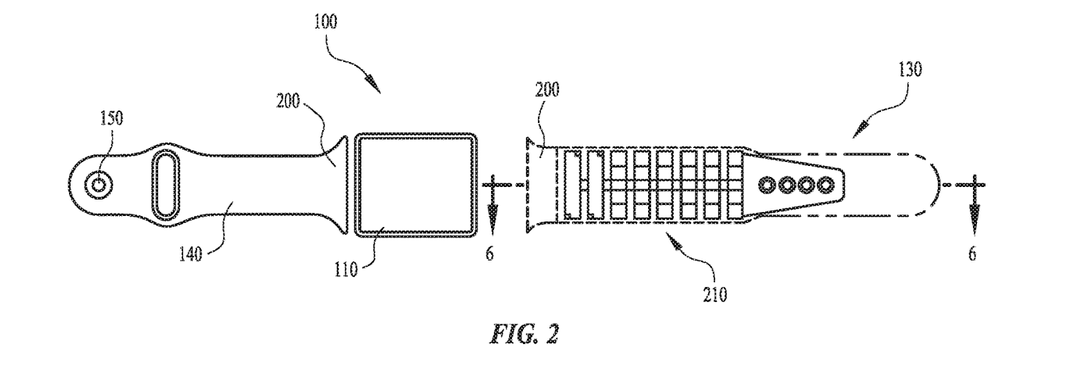
FIG. 2 shows a top view of a wearable device.

FIG. 2 illustrates a top view of wearable device 100 where first band portion 130 and second band portion 140 are separated from watch body 110. Outer portions of first band portion 130 are illustrated in phantom lines in FIG. 2 to better illustrate an inner architecture 210 of first band portion 130 for housing and securing batteries within first band portion 130. Upon an electrical connection between first band portion 130 and watch body 110, the batteries of first band portion 130 can provide power to components of watch body 110. Inner architecture 210 of first band portion 130 can have structural characteristics that help prevent or limit stretching and twisting of first band portion 130, as will be described in more detail below.

First band portion 130 and/or second band portion 140 can be permanently attached to watch body 110 at the time of manufacturing. Alternatively, first band portion 130 and/or second band portion 140 can be attachable and removable at connections 200 by a user so that the user can swap out different watch bands according to their preferences. When worn by a user, first band portion 130 and/or second band portion 140 can be attached to each other or to watch body 110 at attachment mechanism 150 in a variety of manners, such as, for example, with mechanical interlocks, magnets, latches, snap or press-fit connections, hook-and-loop fasteners, or any other suitable connection.

Figure 3:
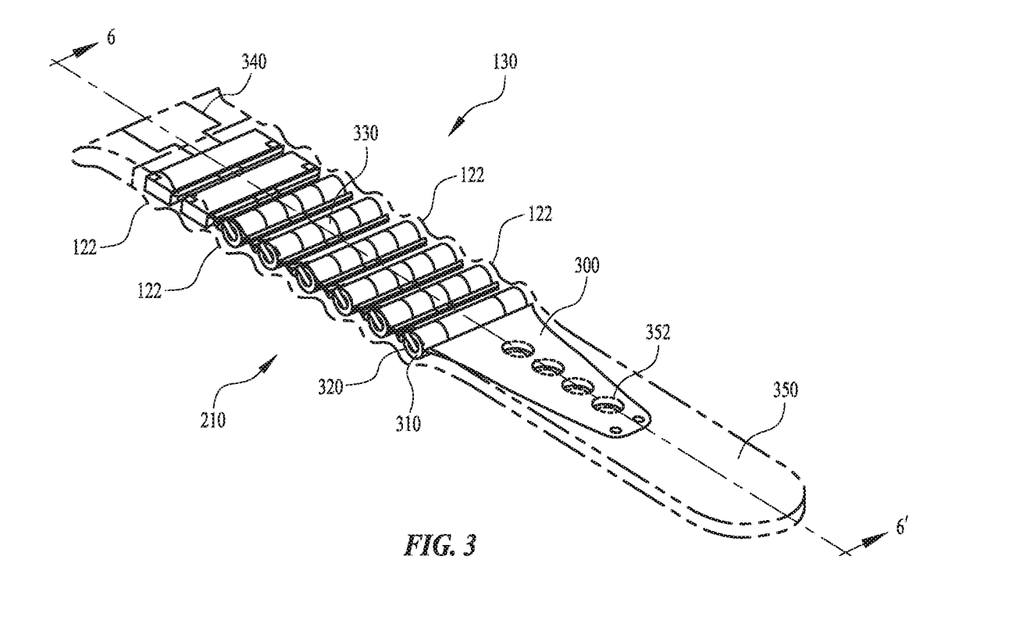
FIG. 3 shows a perspective view of the watch band and its inner architecture.
Figure 4:
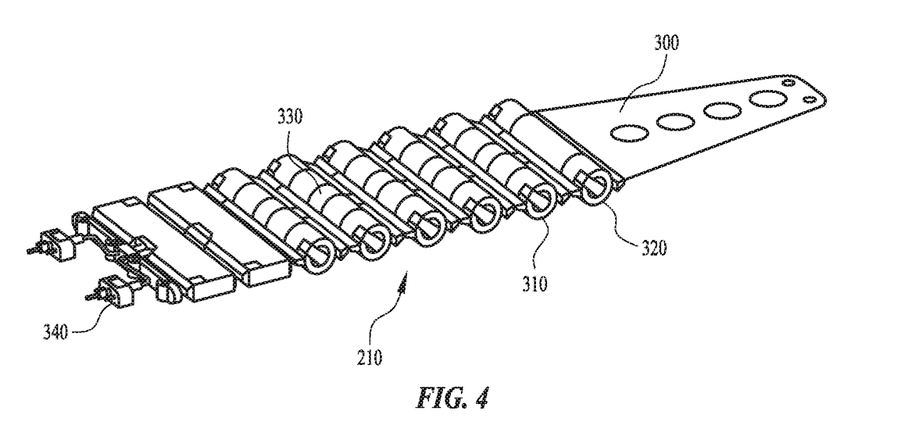
FIG. 4 shows a perspective view of the inner architecture of the watch band.
Figure 5:
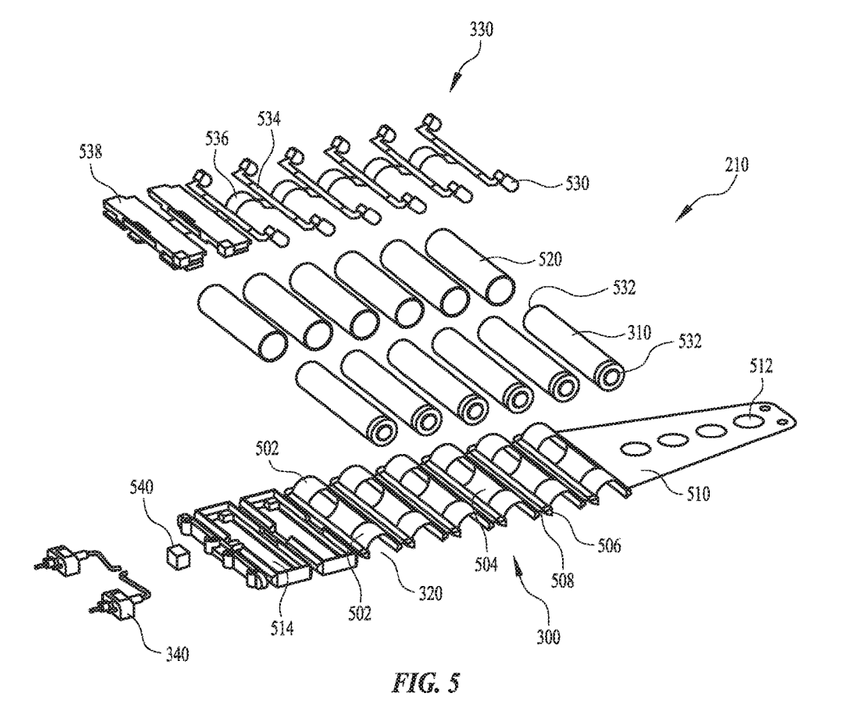
FIG. 5 shows an exploded view of the inner architecture of the watch band of FIG. 4.

FIGS. 3-5 illustrate different views of first band portion 130 with segments 122 showing inner architecture 210. FIG. 3 illustrates a perspective view of first band portion 130 including inner architecture 210. FIG. 4 illustrates inner architecture 210 alone, and FIG. 5 illustrates an exploded view of FIG. 4. Inner architecture 210 can include an inner frame 300, batteries 310, battery slots 320, a battery connector 330, pins 340, and an outer covering 350. Inner frame 300 provides a structure for housing and securing batteries 310 in first band portion 130 in slots 320. Alternatively, slots 320 can house other electrical components in addition to or instead of batteries 310, such as, for example, sensors, antennas, processors, microphones, or any other suitable components.

Battery connector 330 electrically interconnects batteries 310. Outer covering 350 seals batteries 310 and battery connector 330 within first band portion 130. For example, the sealing can be a hermetic seal. Outer covering 350 can be applied to inner frame 300, batteries 310, and battery connector 330 by overmolding, injection molding, compression molding, extrusion molding, dip-molding, sewing, and the like. Outer covering 350 can be silicone, elastomer, caoutchouc, leather, textile, synthetic leather, polyvinyl chloride, or any other suitable material.

Inner frame 300 can be a textile material. For example, inner frame 300 can be fabricated from a non-extendable high-strength fiber scrim, such as, for example, liquid crystal polymer high modulus synthetic fiber, as can be sold under the trade name Vectran®. The term "non-extendable" is used herein to mean having no more than 5% elongation before break. The ultimate tensile strength of inner frame 300 (i.e., of the non-extendable high-strength fiber scrim) can be at least 0.5 GPa (e.g., 0.5-5 GPa) with no more than 5% elongation before break (e.g., 1-4% elongation before break). With its high ultimate tensile strength and low elongation, inner frame 300 helps prevent stretching of first band portion 130 when subjected to outside forces, which helps to minimize stress on internal components of first band portion 130, such as batteries 310, battery connector 330, or other electrical components. Inner frame 300 can be fabricated from a number of different fibers or any suitable material with a high tensile strength (above 0.5 GPa) and low elongation (below 10% elongation before break).

As illustrated in FIG. 5, inner frame 300 includes slots 320 that each house a corresponding battery 310. Accordingly, inner frame 300 can have an equal number of slots 320 and batteries 310. Alternatively, inner frame 300 can include additional slots 320 to house other electrical components and can include empty slots 320 for aesthetic purposes to provide a consistent look and feel to watch band 120. FIG. 5 illustrates inner architecture 210 with six batteries, however, the present disclosure is not as limited as the number of batteries can be more or less than six.

Batteries 310 can have a variety of different shapes and cross sections, such as cylindrical, conical, trapezoidal, capsule, frustum, spherical, tubular, and the like. Slots 320 can have a corresponding shape to match the shapes of the batteries. Batteries 310 can be rechargeable, such as lithium-ion (LiOn), lithium polymer (Li-Pop), nickel-metal hydride (NiMH), nickel-cadmium (NiCd), and the like.

Each slot 320 can include securing portions for securing batteries 310. For example, FIG. 5 illustrates an exploded view of inner architecture 210 and illustrates top securing portions 502 and bottom securing portions 504 forming portions of inner frame 300. Each slot 320 is formed by top securing portions 502 at opposing ends of each slot 320 in the width direction and a bottom securing portion 504 centered between top securing portions 502 for securing battery 310 in slot 320. The use of three securing portions as illustrated in FIG. 5 is merely an example and additional securing portions can be used to secure battery 310 in slot 320. The securing portions can alternate between top securing portions 502 and bottom securing portions 504 in order to better secure battery 310 and to make optimal use of the textile material forming inner frame 300, as will be described in more detail below. Additionally, each battery 310 can be housed in a sleeve 520 that is placed in a slot 320. Sleeve 520 can be fabricated from non-conductive material to help insulate batteries 310.

The placement of the securing portions creates each individual slot 320 for housing batteries 310. For example, during the manufacturing process of inner frame 300, a flat textile material for forming inner frame 300 can extend in a length direction of watch band 120 (e.g., along an axis 302). A pair of slits can be introduced in the material in the direction of axis 302 to create and separate top securing portions 502 and bottom securing portion 504 of each slot 320. Top securing portions 502 can be pushed up and bottom securing portion 504 can be pushed down to form slot 320 when a battery 310 is inserted into slot 320. In this configuration top securing portions 502 and bottom securing portion 504 wrap around the contour of battery 310 and naturally secure it in place from opposing sides. Since the top securing portions 502 and bottom securing portions 504 are made of the same material, the top securing portions 502 and bottom securing portions 504 do not overlap in the width direction. Alternatively, top securing portions 502 and bottom securing portion 504 can be reversed in that the top securing portions 502 are on the bottom and bottom securing portion 504 is on the top. This configuration makes optimum use of the material forming inner frame 300, since it can secure battery 310 from both sides with only a single layer of material.

Additional slits can be made in the direction of axis 302 to create even more securing portions. In some embodiments, each securing portion can have an equal lengths or each securing portion can have differing lengths. However, since the slits are made in the same material, the multiple top and bottom securing portions created do not overlap in the width direction.

In some embodiments, the securing portions can have a top layer and a separate bottom layer connected across their widths at intervals to create each slot 320 between adjacent connections. The top layer can be a top securing portion that extends the width of battery 310 and the bottom layer can be a bottom securing portion that extends the width of battery 310. Alternatively, the top layer and the bottom layer can be shorter or longer than the width of battery 310. In some embodiments, the top layer can have portions removed to create multiple top securing portions. Similarly, the bottom layer can have portions removed to create multiple bottom securing portions. Further, since the top layer and the bottom layer are separate from each other, the top layer and the bottom layer can overlap in the width direction.

As shown in FIG. 5, projections 506 can be attached to inner frame 300 on opposing sides of each slot 320. Each projection 506 can extend along a width of slot 320 and project toward an adjacent slot 320. Alternatively, projections 506 can only extend a portion of the width of slot 320. Projections 506 can have a trapezoidal cross-section and each projection 506 can taper as it projects away from its slot 320. Alternatively, projections 506 can have a variety of different cross-sections, for example, triangle, rectangular, arc-shape, and the like. Projections 506 can be formed of a rigid material, for example, plastic or metal.

The material of inner frame 300 between adjacent slots 320 can act as a flexible section 508. Projections 506 can taper toward flexible section 508. Flexible sections 508 allow flexibility for inner frame 300 to enable first band portion 130 to wrap around a user's wrist. The length of flexible sections 508 helps determine the flexibility of inner frame 300. For example, the longer flexible section 508, the greater the flexibility of inner frame 300. Conversely, the shorter the length of flexible section 508, the less flexibility of inner frame 300, since adjacent projections 506 can have more room to move relative to each other.

Figure 6:
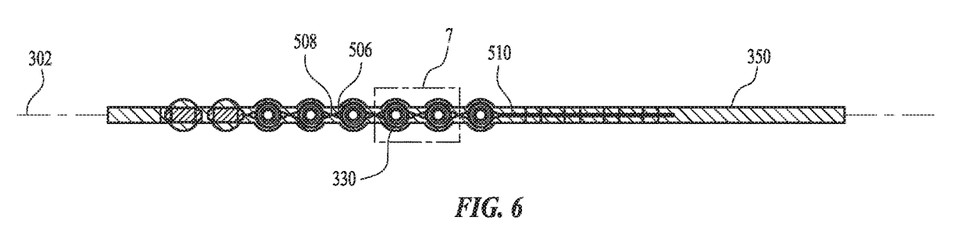
FIG. 6 shows a cross-sectional side view of the watch band and its inner architecture taken along line 6-6' of FIGS. 2 and 3.
Figure 7:
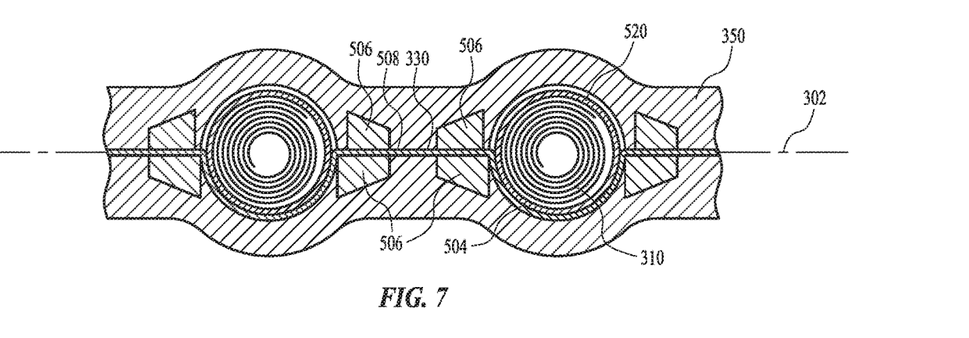
FIG. 7 shows a detail cross-sectional side view of the watch band and its inner architecture taken from area 7 of FIG. 6.

FIG. 6 illustrates a cross-sectional view of first band portion 130 along line 6-6' of FIG. 3. FIG. 7 illustrates a detail view of FIG. 6 taken from area 7 of FIG. 6. Projections 506 can sandwich inner fame 300 on a top and a bottom of inner frame 300 on both sides of each slot 320. A top projection 506 can project a lesser distance toward an adjacent slot 320 than a bottom projection 506. Projections 506 can be attached to inner frame 300 in a variety of different manners, such as, for example, by adhesive, sewing, riveting, fasteners extending through inner frame 300, and the like.

The structure of inner frame 300 and projections 506 promotes torsional rigidity, which helps limit the amount of twisting that inner frame 300 can experience during use. This can help maintain the integrity of internal components such as, for example, batteries 310 and battery connector 330. The width of projections 506, the width of the flexible sections 508, and the distance between adjacent projections 506 affect the ability of inner frame 300 to limit twisting. For example, the distance between projections 506 of adjacent slots 320 (i.e., the length of flexible section 508) puts an upper limit on how far up or down ends of adjacent projections 506 can move relative to each other when first band portion 130 is twisted. The width of inner frame 300 between projections 506 of adjacent slots 320 (i.e., the width of flexible section 508) and the widths of adjacent projections 506 themselves puts an upper limit on the angle adjacent projections 506 can create relative to each other when first band portion 130 is twisted. In some embodiments, projections 506 can twist relative an opposing projection 506 by less than 5 degrees.

Returning to FIG. 5, inner frame 300 can further include an extension 510 that extends along axis 302. Extension 510 can define openings 512, which can be used to attach first band portion 130 to second band portion 140 by attachment mechanism 150. In addition, outer covering 350 can be overmolded over extension 510 and through openings 512 to help secure the molding of outer covering 350 to inner frame 300. This can help strengthen the connection between first band portion 130 and second band portion 140, and can help ensure that any stress put on first band portion 130 is transferred to inner frame 300, through attachment mechanism 150 and openings 512. Accordingly, outer covering 350 can define openings 352 that correspond to openings 512 in inner frame 300, as illustrated in FIG. 3.

As illustrated in FIG. 5, inner frame 300 can further include a housing 514 for electrical component 538. Electrical component 538 can include components that help enable the transfer of power from batteries 310 to the watch body, and likewise, the recharging of batteries 310 when the watch body is connected to a power source. For example, such electrical components 538 can include a processor, a voltage regulator, or other electrical components. Electrical components 538 can further include communications components, such as an antenna and a transceiver for communicating with the watch body.

Power can be transferred from batteries 310 to the watch body through a conducted electrical path such as battery connector 330. Battery connector 330 interconnects batteries 310 to each other and transfers power from batteries 310 to the watch body. For example, battery connector 330 electrically interconnects batteries 310, electrical components 538, and/or pins 340. Battery connector 330 can be a rigid flex printed circuit board, wires, or any other suitable connection. Battery connector 330 can be fabricated from copper, gold, silver, conductive polymers, plasmas, or other suitable substitutes or combinations.

Battery connector 330 can further include tabs 530 that connect to batteries 310. For example, battery connector 330 can include a pair of tabs 530 for each battery 310 to order to connect the pair of tabs 530 to opposing ends 532 of each battery 310. Tabs 530 can be connected to battery 310 by welding, soldering, crimping, brazing, or any other suitable connection.

Tabs 530 can be connected together by a lateral joint 534 with tabs 530 on each end of lateral joint 534. Lateral joint 534 can extend the entire width of battery 310. Battery connector 330 can include lateral joints 534 for each battery 310. Each lateral joint 534 can be secured to a projection 506. Adjacent lateral joints 534 can be connected together by a central joint 536. Central joints 536 can connect all lateral joints 534 together. In this manner, all of the batteries 310 are interconnected and battery connector 330 is able to transfer power from batteries 310 to the watch body through pins 340 that extend from a proximal end of first band portion 130 to connect to the watch body. For example, pins 340 can be connector pins (e.g., fixed or pogo pins). A seal 540 can further seal pins 340 where pins 340 extend from inner frame 300. The pins 340 can also be used to charge the batteries of the watch band independently of a connection with the watch body. Alternatively or additionally, one or more coils of the first band portion 130 can inductively couple to the watch body. For example, the one or more coils can operate to induce an electrical current in one or more coils of the watch body. Accordingly, the watch band can provide electrical power to the watch body without physical and/or conductive contact.

Battery connector 330 is connected to inner frame 300 which can help protect battery connector 330 from stretching and twisting. As discuss previously, the architecture and material of inner frame 300 and projections 506 helps prevent stretching and twisting of inner frame 300. The integrity of battery connector 330 helps ensure that the power from batteries 310 can be transferred to the watch body and that those batteries 310 can be recharged when the watch body is connected to a power recharging source. If battery connector 330 is severed or the connection is broken in any manner along battery connector 330, the ability to harness the power of each of batteries 310 can be limited. For example, if any components of battery connector 330, such as tabs 530, lateral joint 534, or central joints 536 are compromised or broken, the ability to transfer power from batteries 310 or to recharge batteries 310 can be cut off for batteries 310 downstream from the broken component.

FIGS. 2-7 illustrate batteries 310 disposed within first band portion 130, however, the present disclosure is not so limited. Alternatively, each band portion (e.g., first band portion 130 and second band portion 140) can each house batteries 310 in the same manner as described above. Each first band portion 130 and second band portion 140 can connect directly to watch body 110 to transfer power from batteries 310 to watch body 110. Alternatively, first band portion 130 and second band portion 140 can electrically connect to each other through attachment mechanism 150. Further, watch band 120 can include slots 320 that do not house batteries or electrical components. The empty slots can be included for aesthetic purposes in order to provide a consistent look and feel to watch band 120.

Figure 8:
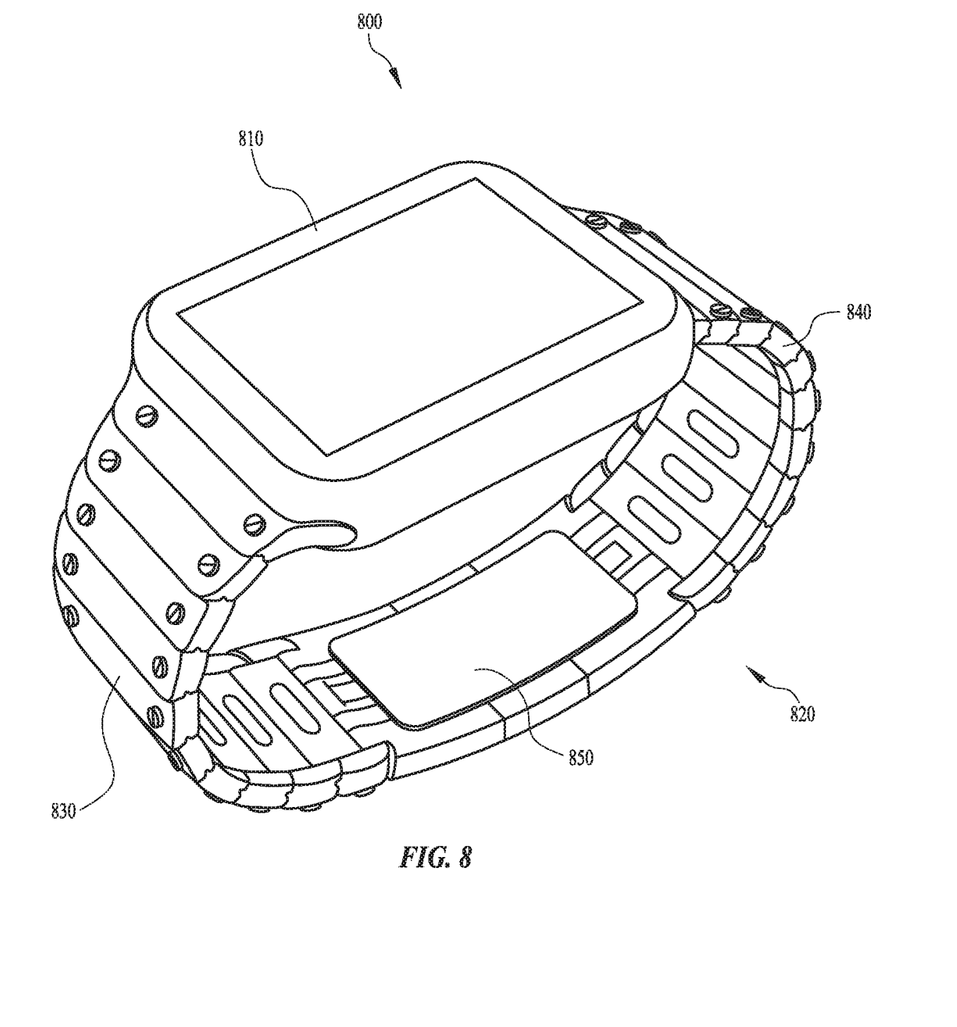
FIG. 8 shows a perspective view of a wearable device including a watch band.

FIG. 8 illustrates a wearable device 800, according to some embodiments, which can include a watch body 810, a watch band 820 with a first band portion 830 and a second band portion 840, and an attachment mechanism 850. Wearable device 800 can be attached and secured to a user's wrist by connecting first band portion 830 to second band portion 840 by attachment mechanism 850. Watch band 820 can have an outer frame that helps limit stretching and/or twisting of watch band 820 to help protect batteries and electrical components within watch band 820.

Figure 9:
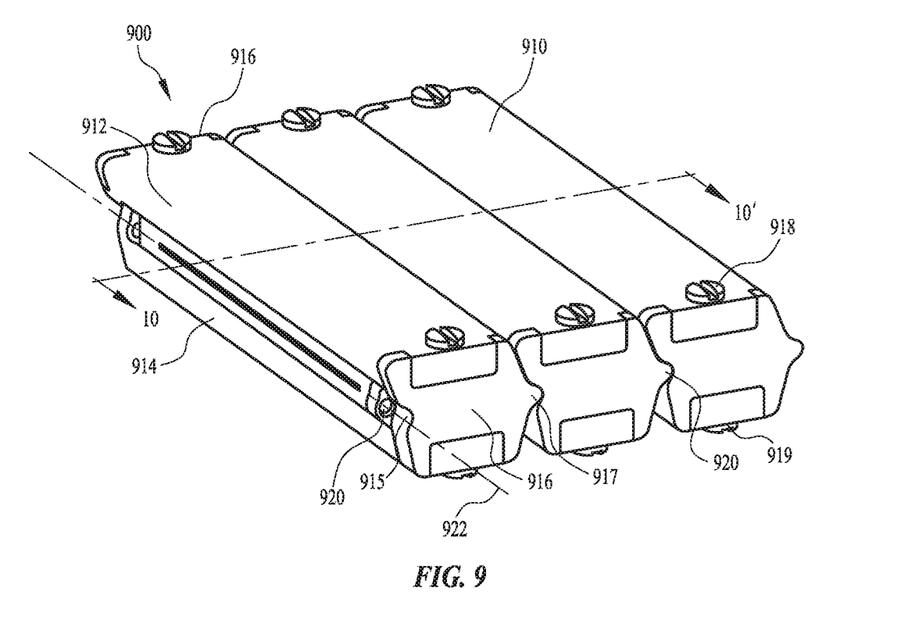
FIG. 9 shows a perspective view of a portion of the watch band.

FIG. 9 illustrates a portion of watch band 820 with an outer frame 900 including mechanical links 910 that can be interconnected to each other along a portion of watch band 820 (e.g., the entirety of watch band 820). Links 910 can be of equal size and length, or alternatively, the size and length of links 910 can vary. Outer frame 900 provides a structure for housing and securing batteries in watch band 820. Links 910 can be stainless steel, ceramic, titanium, gold, or any other suitable metal or material.

One or both of first band portion 830 and second band portion 840 can include links 910, each of which can include a battery contained therein to provide power for wearable device 800. In some embodiments each link 910 of a watch band 820 contains a battery or other electronic component. Alternatively, only some of links 910 can contain a battery or other electronic component, while other links 910 are included to provide a consistent look and feel. Empty links 910 on watch band 820 can allow for removal of empty links 910 in order to size watch band 820 to the user's wrist.

Each link 910 can include an upper portion 912, a lower portion 914, and end portions 916 that oppose each other. Lower portion 914 can be a portion of outer frame 900 that is in contact with the user's wrist when worn, whereas, upper portion 912 can be a portion of outer frame 900 that is not in contact with the user's wrist. Outer frame 900 can further include fasteners or screws 918 and 919 to couple upper portion 912, lower portions 914 and end portions 916 together. For example, screw 918 connects upper portion 912 to a corresponding end portion 916 and a separate screw 919 connects lower portion 914 to the same corresponding end portion 916. Alternatively, upper portion 912, lower portions 914, and end portions can be coupled by bonding, soldering, welding, crimping, riveting, mechanical fasteners, or any other suitable connection.

Links 910 are connected to adjacent links 910 by a connection 920. Connection 920 provides an axis of rotation 922 between adjacent links 910 to allow adjacent links 910 to rotate relative to each other. The extent of rotation of links 910 can be limited by the design and shape of the end portions 916. For example, end portion 916 can include a projection 917 that projects from at least one side of end portion 916 within a corresponding indentation 915 on an opposing side of an adjacent end portion 916. The shapes of projection 917 and indentation 915 can allow for a rotation around an axis of rotation 922 from, for example, 0 to 45 degrees between adjacent links 910 (e.g., 15 to 30 degrees). The degrees of rotation can vary dependent upon the number of links 910 in watch band 820. For example, the more links 910 in watch band 820, the smaller the degree of rotation can be between adjacent links 910. Conversely, the fewer links 910 in watch band 820, the greater the degree of rotation can be between adjacent links 910. In this manner, links 910 allow the watch band to wrap around a user's wrist, but limit the range of rotation between adjacent links 910.

Figure 10:
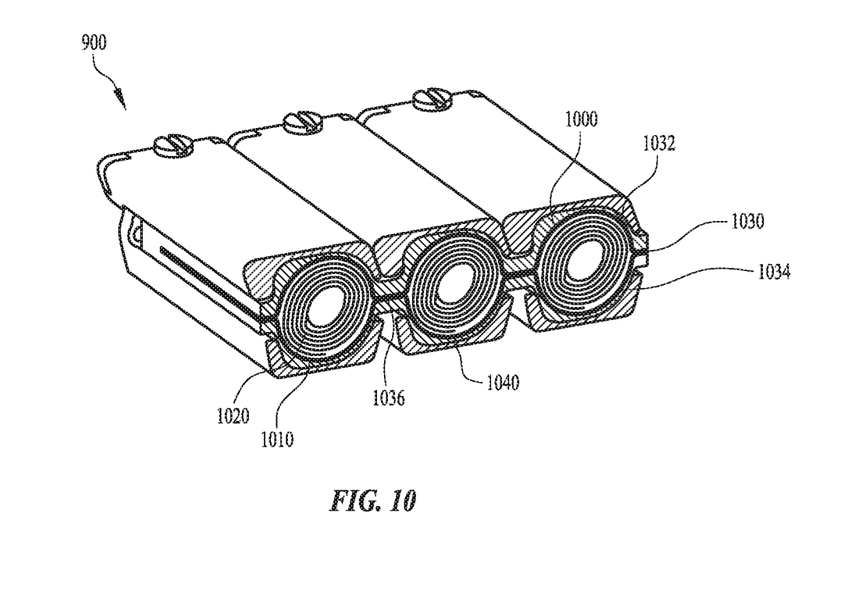
FIG. 10 shows a cross-sectional perspective view of the portion of the watch band of FIG. 9 taken along line 10-10'.

FIG. 10 is a perspective cross-sectional view along line 10-10' of FIG. 9. It illustrates an inner covering 1000 disposed within outer frame 900. Inner covering 1000 can include slots 1010 for housing and securing batteries 1020 within inner covering 1000. Slots 1010 can be evenly spaced or spaced at irregular intervals along inner covering 1000.

Outer frame 900 can also include cavities 1040 that correspond with slots 1010 of inner covering 1000. Upper portion 912 and lower portion 914 can have concave interior surfaces (shown U-shaped in cross-section) to receive corresponding slots 1010 of inner covering 1000.

Batteries 1020 within slots 1010 of inner covering 1000 are interconnected to each other by a battery connector 1030. Battery connector 1030 can create a conducted electrical pathway for transferring power from each battery 1020 to watch body 810. Battery connector 1030 can extend along the width of batteries 1020 and be encompassed and sealed within inner covering 1000. Alternatively, battery connector 1030 can extend only a portion of the width of battery 1020 and still be encompassed and sealed within inner covering 1000. Battery connector 1030 can be fabricated from copper, gold, silver, conductive polymers, plasmas, or other suitable substitutes or combinations. Battery connector 1030 can be wires, rigid flex printed circuit board, conductive inks, or another suitable conductive material. Battery connector 1030 can connect to the ends of batteries 1020 (e.g., through tabs such as described above with respect to battery connector 330), and can extend between adjacent batteries 1020 between top and bottom layers of inner covering 1000.

In some embodiments, battery connector 1030 includes a top layer 1032 and a bottom layer 1034. Alternatively, in another embodiment, battery connector 1030 can be either a top layer 1032 or a bottom layer 1034 to interconnect the batteries 1020 together. Top layer 1032 of battery connector 1030 follows the top contours of battery 1020 and bottom layer 1034 of battery connector 1030 follows the bottom contours of battery 1020. Top layer 1032 and bottom layer 1034 can be connected together between adjacent batteries 1020 by bonding, mechanical fasteners, welding, soldering, crimping, brazing, or any other suitable connection. Batteries 1020 can be evenly spaced or spaced at irregular intervals along inner covering 1000.

Upper and lower portions of inner covering can extend and be connected together between adjacent batteries 1020 by bonding, mechanical fasteners, welding, soldering, crimping, brazing, pressure applied by outer frame 900, or any other suitable connection. The extension of inner covering 1000 and battery connector 1030 between adjacent batteries 1020 creates a flexible hinge joint 1036, which allows flexibility of inner covering 1000 and battery connector 1030. The length of flexible hinge joint 1036 depends upon the amount of flexibility desired of inner covering 1000. For example, inner covering 1000 has greater flexibility the longer the length of flexible hinge joint 1036. Conversely, inner covering 1000 has less flexibility the shorter the length of flexible hinge joint 1036.

Batteries 1020 and battery connector 1030 are entirely encompassed and hermetically sealed within inner covering 1000, except for the connection of the battery connector 1030 to the watch body 810 by pins, similar to pins 340 described above. Inner covering 1000 can be silicone, elastomers, caoutchouc, or any other suitable material that hermetically seals the batteries within outer frame 900. Inner covering 1000 can be manufactured by overmolding, injection molding, compression molding, extrusion molding, dip-molding, and the like.

Figure 11:
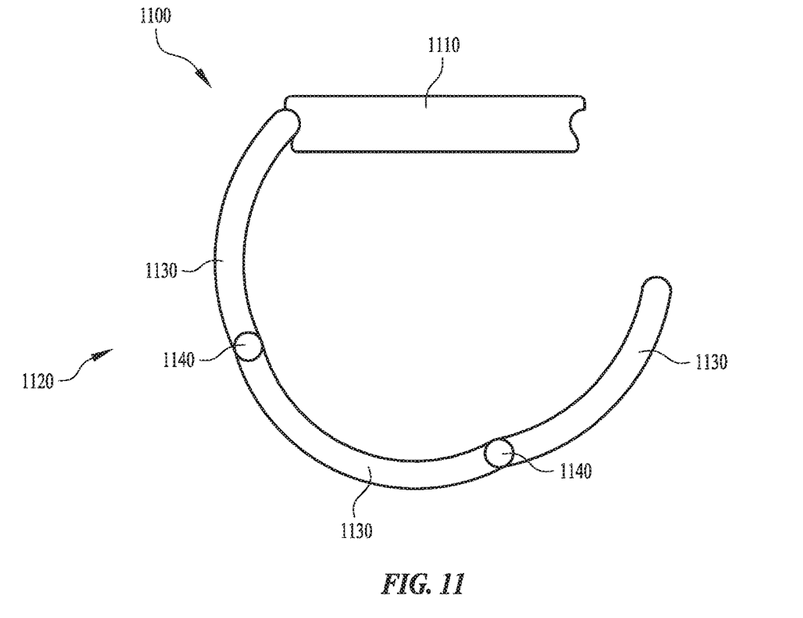
FIG. 11 shows a side view of a wearable device including a watch band.

FIG. 11 illustrates a wearable device 1100, according to some embodiments, that can include a watch body 1110 and a watch band 1120 with watch band links 1130 and rotational connectors 1140. Watch band links 1130 can vary in size or each link 1130 can be of equal size. Watch band links 1130 can be connected to each other by rotational connectors 1140, which allows for rotation between adjacent links 1130. This enables watch band 1120 to wrap around a user's wrist. Links 1130 can have a slight curvature to allow watch band 1120 to more naturally wrap around the user's wrist. For example, at least one link 1130 can have a curved shape that has an arc length of at least 3 centimeters (e.g., at least 5 centimeters). Alternatively, links 1130 can be flat. For illustrative purposes, FIG. 11 illustrates three links 1130, however, the present disclosure is not so limited, and there can be more or less than three links 1130. One or more of links 1130 can house one or more batteries within link 1130. For example, links 1130 that have a direct connection to watch body 1110 can house a battery and links 1130 that does not have a direct connection to watch body 1110 cannot house a battery. Alternatively, all of links 1130 can house batteries, and the conducted electrical connection can pass through rotational connectors 1140 (e.g., in the same manner as described above with reference to battery connector 1030), thereby interconnecting all of the batteries within links 1130, which allows the power from the batteries to be transferred to watch body 1110.

Figure 12:
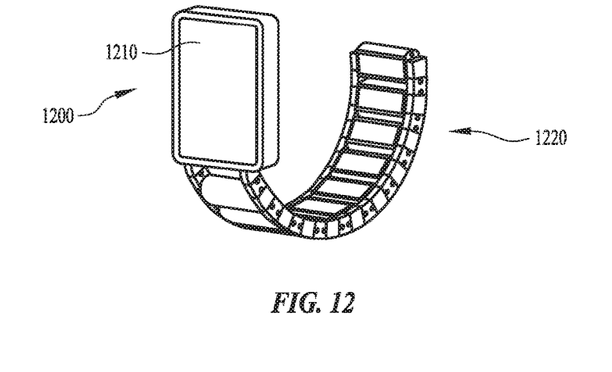
FIG. 12 shows a partial perspective view of a wearable device including a watch band.
Figure 13:
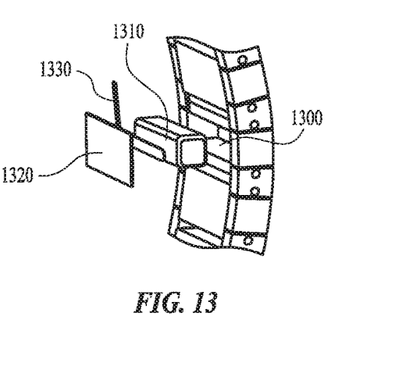
FIG. 13 shows an exploded detail view of the watch band of FIG. 12.

FIGS. 12 and 13 illustrate a wearable device 1200, according to some embodiments, that can include a watch body 1210 and a watch band 1120 that includes compartments 1300. Each compartment 1300 can house a battery 1310 and a battery connector 1330 for connecting batteries in separate compartments to each other (e.g., in the same manner as described above with reference to battery connector 1030). Battery 1310 and battery connector 1330 can be sealed within compartment 1300 by a compartment lid 1320. Batteries 1310 can be interconnected to each other by watch band 1220 (e.g., in the same manner as described above with reference to battery connector 1030, where a portion of inner covering 1000 is replaced by a seal of compartment lid 1320), which transfers the power of the batteries to watch body 1210 and also allows recharging of batteries 1310. This configuration can facilitate removal and replacement of batteries from watch band 1120.

It will be recognized that aspects of wearable device 1200 can be applied to other embodiments described herein. For example, upper portion 912 of watch band 820, illustrated in FIGS. 9-10, can include a removable lid similar to compartment lid 1320 so that batteries 1020 can be removed and replaced. By further example, a portion of inner covering 1000 can be removable and replaceable with upper portion 912 to provide access to battery 1020.

Figure 14:
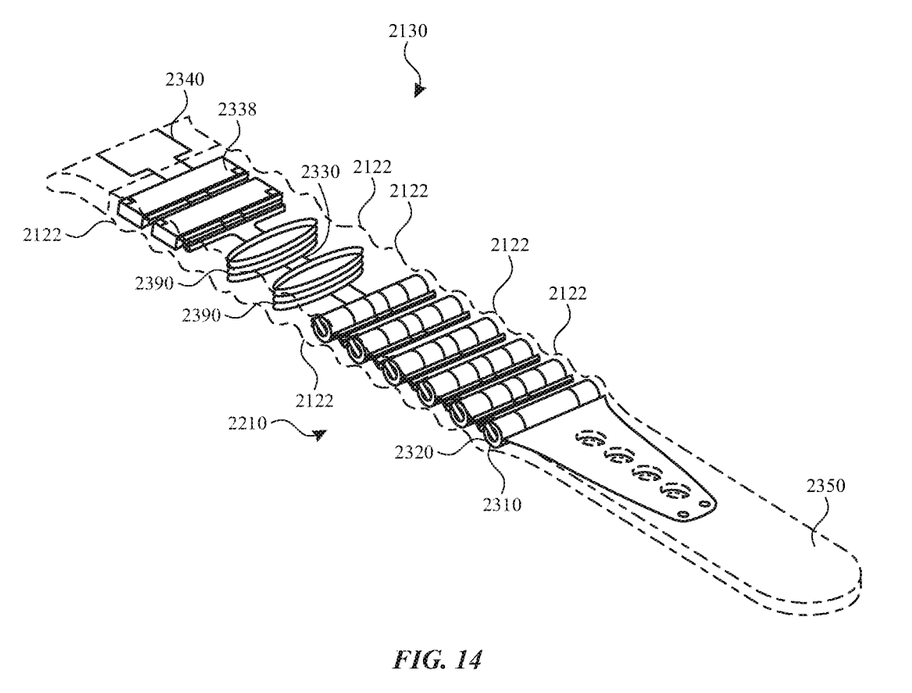
FIG. 14 shows a perspective view of a watch band and its inner architecture.

The batteries of a watch band can be charged independently of the watch body. For example, the watch band can include an ability to receive power wirelessly through inductive coupling. FIG. 14 illustrates a view of first band portion 2130 with segments 2122 showing inner architecture 2210. Inner architecture 2210 can include batteries 2310, battery slots 2320, a battery connector 2330, and one or more pins 2340. An inner frame provides a structure for housing and securing batteries 2310 in first band portion 2130 in slots 2320. Alternatively or additionally, slots 2320 can house other electrical components in addition to or instead of batteries 2310, such as, for example, sensors, antennas, processors, microphones, or any other suitable components.

As illustrated in FIG. 14, first band portion 2130 can include one or more induction coils 2390 for receiving power wirelessly. Each of induction coils 2390 can be positioned within a segment 2122 of first band portion 2130. While two induction coils 2390 are shown in FIG. 14, it will be recognized that any number of induction coils 2390 can be provided. Induction coils 2390 can include one or more wires wound about the same or different axes. Induction coils 2390 can have a shape that fits within its corresponding segment 2122 to provide a shape that is consistent with other segments 2122 or otherwise provides a consistent look and feel to first band portion 2130. For example, induction coils 2390 can have a size and shape that is generally similar to the size and shape of the batteries 2310. Induction coils 2390 can be wound about a magnetic core for structural support and improved induction capabilities. Alternatively or additionally, induction coils 2390 can include one or more flexible printed circuits.

Multiple induction coils 2390 can be grouped together or distributed within the first band portion 2130. For example, induction coils 2390 can be positioned adjacent to each other, within a same segment 2122, within adjacent segments 2122, and/or within non-adjacent segments 2122. Where induction coils 2390 are grouped in close proximity, wireless power can be more efficiently transferred to a localized region. By further example, induction coils 2390 can be distributed among and separated by batteries 2310 and/or electrical components 2338. Where induction coils 2090 are distributed, wireless power can be transferred to one or more of a variety of regions.

Multiple induction coils 2390 can have the same or different orientations within the first band portion 2130. It will be recognized that an orientation of each induction coil 2390 can be defined by an axis of winding or a direction in which induction coil 2390 is most sensitive to a given magnetic field. Where induction coils 2390 have the same orientation, induction coils 2390 can be similarly sensitive to a given magnetic field. Accordingly, induction coils 2390 can effectively receive maximum power while first band portion 2130 is in a particular orientation.

Where induction coils 2390 have different orientations, induction coils 2390 can be sensitive to different magnetic fields. For example, 2 or more induction coils 2390 can have orthogonal orientations, such that the induction coils 2390 are wound about orthogonal axes or most sensitive to magnetic fields that are orthogonal to each other. Accordingly, at least one of induction coils 2390 can effectively receive power while first band portion 2130 is in any one of a variety of orientations.

The inner frame can further house one or more electrical components 2338. Electrical component 2338 can include components that help enable the transfer of power from batteries 2310 to the watch body, and likewise, the recharging of batteries 2310 with induction coils 2390. For example, such electrical components 2338 can include a processor, a voltage regulator, or other electrical components.

Battery connector 2330 electrically interconnects batteries 2310, induction coils 2390, electrical components 2338, and/or pins 2340. Outer covering 2350 seals batteries 2310, induction coils 2390, and battery connector 2330 within an interior of first band portion 2130. For example, the sealing can be a hermetic seal. Outer covering 2350 can be applied to batteries 2310, induction coils 2390, and battery connector 2330 by overmolding, injection molding, compression molding, extrusion molding, dip-molding, sewing, and the like.

Figure 15:
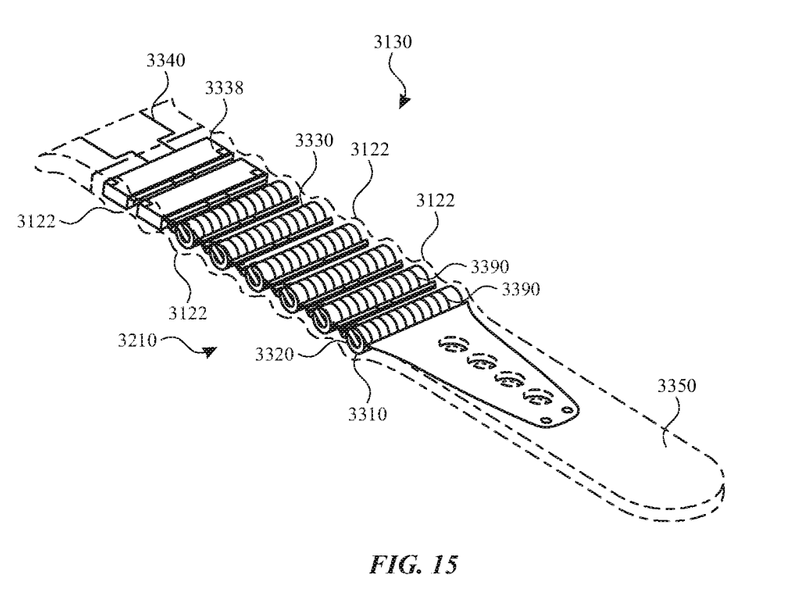
FIG. 15 shows a perspective view of a watch band and its inner architecture.

FIG. 15 illustrates a view of first band portion 3130 with segments 3122 showing inner architecture 3210. Inner architecture 3210 can include batteries 3310, battery slots 3320, a battery connector 3330, and one or more pins 3340. An inner frame provides a structure for housing and securing batteries 3310 in first band portion 3130 in slots 3320. Alternatively or additionally, slots 3320 can house other electrical components in addition to or instead of batteries 3310, such as, for example, sensors, antennas, processors, microphones, or any other suitable components.

As illustrated in FIG. 15, first band portion 3130 can include one or more induction coils 3390 for receiving power wirelessly. Induction coils 3390 can include one or more wound wires. Each of induction coils 3390 can be positioned about a corresponding battery 3310. For example, within a given segment 3122, a battery 3310 and an induction coil 3390 can both be positioned to fit within the given segment 3122. Induction coils 3390 can be positioned against a battery 3310 or about a structure supporting battery 3310. Induction coils 3390 can be provided about one or more of batteries 3310.

The inner frame can further house one or more electrical components 3338. Electrical component 3338 can include components that help enable the transfer of power from batteries 3310 to the watch body, and likewise, the recharging of batteries 3310 with induction coils 3390. For example, such electrical components 3338 can include a processor, a voltage regulator, or other electrical components.

Battery connector 3330 electrically interconnects batteries 3310, induction coils 3390, electrical components 3338, and/or pins 3340. Outer covering 3350 seals batteries 3310, induction coils 3390, and battery connector 3330 within an interior of first band portion 3130. For example, the sealing can be a hermetic seal. Outer covering 3350 can be applied to batteries 3310, induction coils 3390, and battery connector 3330 by overmolding, injection molding, compression molding, extrusion molding, dip-molding, sewing, and the like.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A watch band, comprising:
   multiple batteries;
   an inner frame with slots configured to receive the batteries;
   a battery connector that is configured to be electrically connected to each of the batteries and to transfer power from the batteries to a watch body;
   first tapered projections each positioned on a first side of a corresponding one of the multiple batteries;
   second tapered projections each positioned on a second side of a corresponding one of the multiple batteries; and
   an outer covering that entirely encompasses the inner frame, the batteries, the first tapered projections, the second tapered projections, and at least a portion of the battery connector.

2. The watch band of claim 1, the battery connector comprising a non-extendable, flexible fiber having flexible sections between adjacent slots, the first and second tapered projections being attached to the inner frame on opposing sides of each slot and on opposing sides of the flexible sections, with adjacent pairs of the first and second tapered projections being rotationally connected to each other by the flexible sections.

3. The watch band of claim 2, wherein each of the first and second tapered projection has a trapezoidal cross-section that tapers away from the corresponding slot.

4. The watch band of claim 1, wherein the inner frame further comprises an extension that extends beyond the slots, the extension defining first openings for receiving an attachment mechanism, the outer covering defining second openings that correspond to the first openings in the extension.

5. The watch band of claim 1, further comprising a pin for conductively connecting the batteries to the watch body.

6. The watch band of claim 1, further comprising the batteries, wherein each battery is positioned within a corresponding one of the slots.

7. The watch band of claim 1, wherein each slot of the inner frame is defined by top securing portions and a bottom securing portion, the top securing portions and the bottom securing portion being configured to be disposed around a corresponding one of the batteries.

8. The watch band of claim 7, wherein the top securing portions and the bottom securing portion do not overlap.

9. The watch band of claim 1, further comprising an induction coil for receiving wireless power to charge the batteries.

10. The watch band of claim 9, wherein the induction coil is wound about one of the batteries.

11. A watch band comprising:
an inner covering having slots;
batteries, each of the batteries being hermetically sealed in a corresponding one of the slots;
a battery connector that connects the batteries to each other and is configured to transfer power from the batteries to a watch body; and
tapered projections positioned on opposing sides of each of the batteries on opposing sides of the battery connector;
an outer frame comprising multiple links, each of the links comprising an upper portion and a lower portion on opposing sides of a corresponding one of the batteries, wherein the inner covering extends continuously through and within an interior portion of each of the multiple links of the outer frame, and between opposing pairs of the upper portions and the lower portions, the outer frame is non-extendable, each of the slots and batteries is disposed within a cavity of a corresponding one of the links of the outer frame, and the inner covering hermetically seals the batteries and the tapered projections.

12. The watch band of claim 11, wherein the outer frame comprises metallic links.

13. The watch band of claim 12, wherein the metallic links are rotationally connected to each other.

14. The watch band of claim 11, wherein the inner covering is an elastomer.

15. A wearable device comprising:
a watch body; and
a watch band coupled to the watch body and comprising:
batteries hermetically sealed within an outer covering;
a battery connector that connects the batteries to each other with flexible sections between adjacent batteries, wherein the battery connector transfers power from the batteries to the watch body;
projections positioned on opposing sides of each of the batteries on opposing sides of the battery connector, wherein the outer covering extends continuously around each of the batteries and the projections.

16. The wearable device of claim 15, wherein the battery connector comprises a non-extendable, flexible fiber, and the outer covering comprises an elastomer that is molded over the battery connector.

17. The wearable device of claim 16, further comprising:
an inner frame comprising slots for housing the batteries; and
the projections being attached to the inner frame on opposing sides of each slot and on opposing sides of the flexible sections, with adjacent projections being rotationally connected to each other by the flexible sections, wherein each projection has a trapezoidal cross-section that tapers away from the corresponding slot of each projection;
wherein the inner frame further comprises an extension that extends beyond the slots, the extension defining first openings for receiving an attachment mechanism, the outer covering defining second openings that correspond to the first openings in the extension;
wherein each slot of the inner frame is defined by top securing portions and a bottom securing portion, the top securing portions and the bottom securing portion being disposed around a corresponding one of the batteries.

18. The wearable device of claim 17, wherein at least one of the slots houses an antenna.

19. The wearable device of claim 15, wherein the watch band further comprises:
an outer frame that includes cavities that each house one of the batteries, wherein the outer frame is non-extendable.

20. The wearable device of claim 19, wherein the outer frame is formed of metallic links, each metallic link including an upper portion, a lower portion, and end portions, wherein the upper portion and the lower portion have corresponding concave interior surfaces that form the cavities, and the metallic links are rotationally connected.

* * * * *